Patented June 20, 1933

1,914,957

UNITED STATES PATENT OFFICE

OSCAR NEUSS, OF BERLIN-CHARLOTTENBURG, GERMANY

PROCESS FOR THE MANUFACTURE OF CONDENSATION PRODUCTS FROM UREA AND FORMALDEHYDE

No Drawing. Application filed December 5, 1931, Serial No. 579,338, and in Germany February 18, 1930.

The present invention relates to a process for the manufacture of condensation products from urea or its derivatives and formaldehyde.

During the hot condensation of condensates of urea and formaldehyde in aqueous solutions according to known methods the solution of formaldehyde is heated and urea added to this hot solution. In this way clear substances are obtained. Owing to the heating of the formaldehyde solution a large portion of the formaldehyde gas will escape from the liquid. For that reason it is necessary in the beginning to make allowance for this by the use of a considerable excess of formaldehyde solution (urea: formaldehyde at the ratio of 1:5). But on the other hand undesirable quantities of water are carried along by the condensate when this process is used.

Some of the products of condensation, as for instance those prepared according to the process referred to above, will require several months in becoming dry, due to the use of this process, which constitutes a considerable drawback. If artificial drying is resorted to, it will result in the formation of bubbles which are undesirable in the condensation products.

In order to prevent the escape of the formaldehyde gas during the hot condensation it has already been suggested to carry out the condensation in a closed receptacle under an increased pressure in the autoclave. Such method, however, results in several inconveniences for instance, pressure receptacles must be used for the process, the condensation eludes inspection owing to the working with the autoclave, and finally, the condensation must be carried through for a considerable period, in most instances for several hours. But if the formaldehyde solution is heated without being subjected to pressure, a portion of the formaldehyde gas will escape.

The method of the present invention follows a different process. According to this invention the urea is fused and the solution of formaldehyde is subsequently introduced into the molten mass thus obtained. According to this novel method although the condensation is carried out at atmospheric pressure and with the application of heat, the temperature, however, will not rise above the boiling point of the water. The condensation is finished within a few seconds, for during the pouring of the formaldehyde into the fused urea there will be spontaneously precipitated a chalky, porous and opaque substance, while in contradistinction with the old process referred to above condensation will require several hours.

The process of the invention has nothing in common with a process already known in which a highly concentrated solution of solid polymers of formaldehyde in which urea is dissolved, is employed for a brief reaction period and for obtaining a highly anhydrous condensate, whereupon the liquid is subjected to the action of heat. The method of this invention offers considerable advantages over the known process. These advantages are to be seen in that the formaldehyde employed in my process is much cheaper than the solid polymers of formaldehyde (trioxymethylene). In addition the process of my invention is a much simpler process. Moreover according to the older method a viscous substance is obtained, which will persistently retain the bound water and which product will be brought to coagulation only by subsequent heating. According to this invention there will be precipitated at once a solid, chalky, porous and opaque substance, to which the water adheres only mechanically and which can be further treated after having been subjected to a brief drying process with the application of heat and pressure.

Example 100 grams of urea are heated up to the fusing point and as soon as the urea is molten, 200 grams of a 40% formaldehyde solution (by volume) and in a given case condensation agents such as, salts, acids, bases (as for instance 4 grams of concentrated sulphuric acid) is poured into the molten mass. The reaction is completed within a very short time and a highly porous product possessing the appearance of chalk is obtained, which is then washed and dried in the open air and subsequently pressed under the application of heat into a transparent or horny and compact material. Binding material, fibrous material, fillers, colouring matter as well as the customary fluxes such as phonol, cresol or derivatives of urea may be added to the fused urea.

I claim:

1. A process for the manufacture of condensation products from a urea and formaldehyde comprising the steps of fusing the urea, and introducing the formaldehyde in aqueous solution into the molten mass.

2. A process for the manufacture of condensation products from a urea and formaldehyde comprising the steps of fusing the urea, adding sulphuric acid as a condensation agent thereto, and introducing the formaldehyde in aqueous solution into the molten mass.

In testimony whereof I affix my signature.

OSCAR NEUSS.